No. 706,428. Patented Aug. 5, 1902.
J. P. MAGNEY.
APPLE CORER AND PARER.
(Application filed Dec. 21, 1901.)
(No Model.) 3 Sheets—Sheet 2.
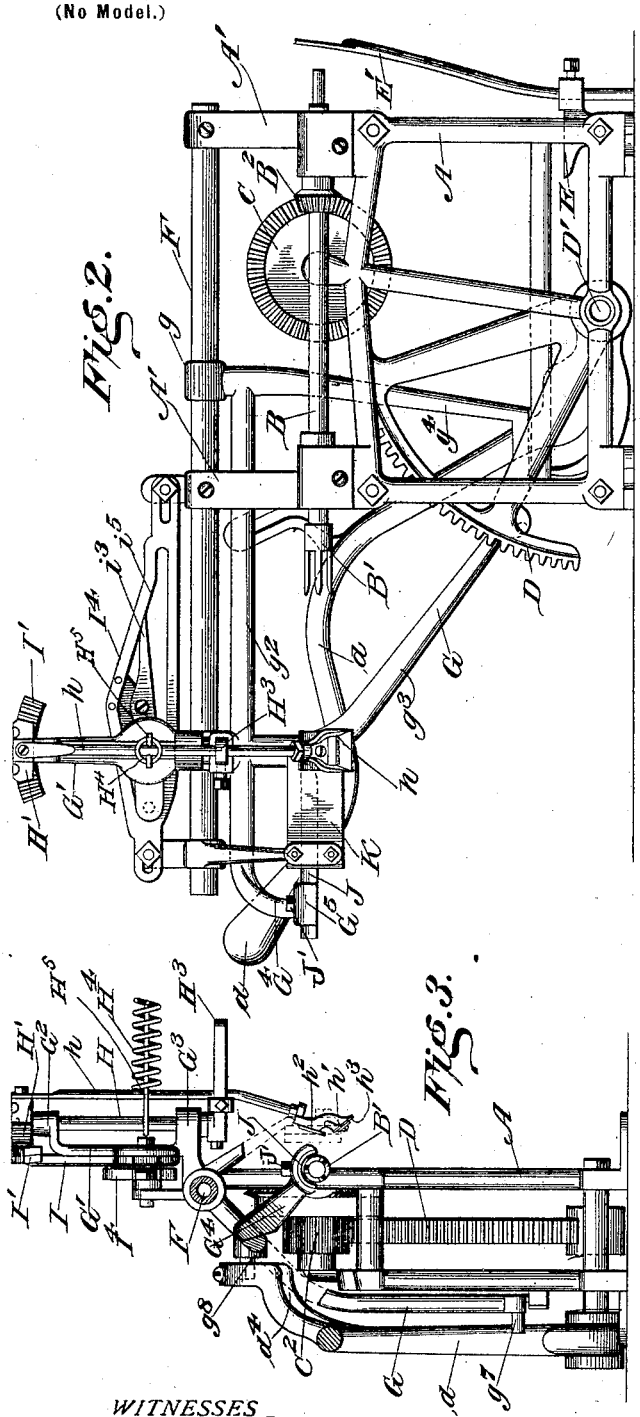
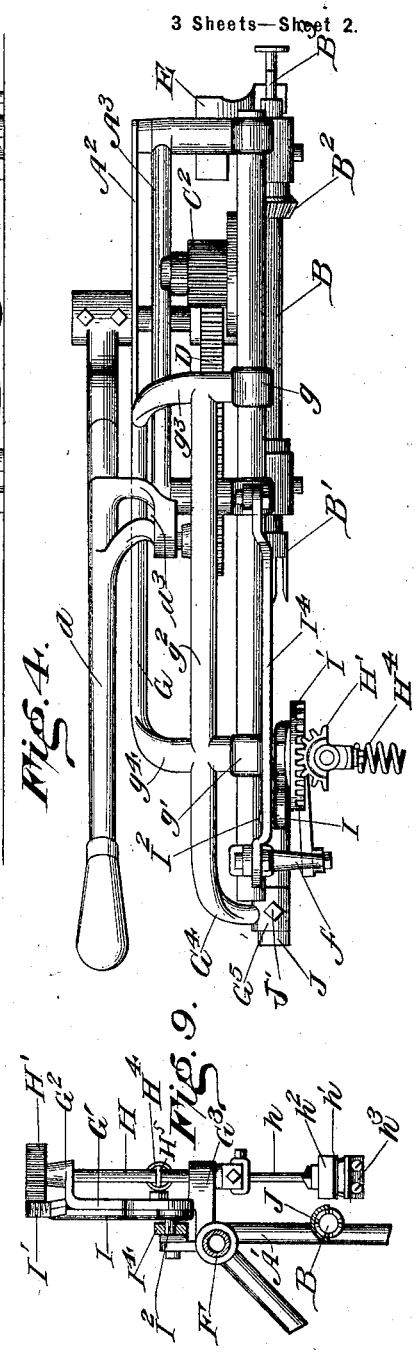
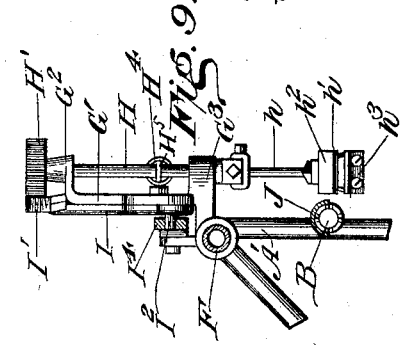
WITNESSES
M. Fowler
James R. Mansfield
INVENTOR:
Joseph P. Magney
By Alexander & Dowell
Attorneys

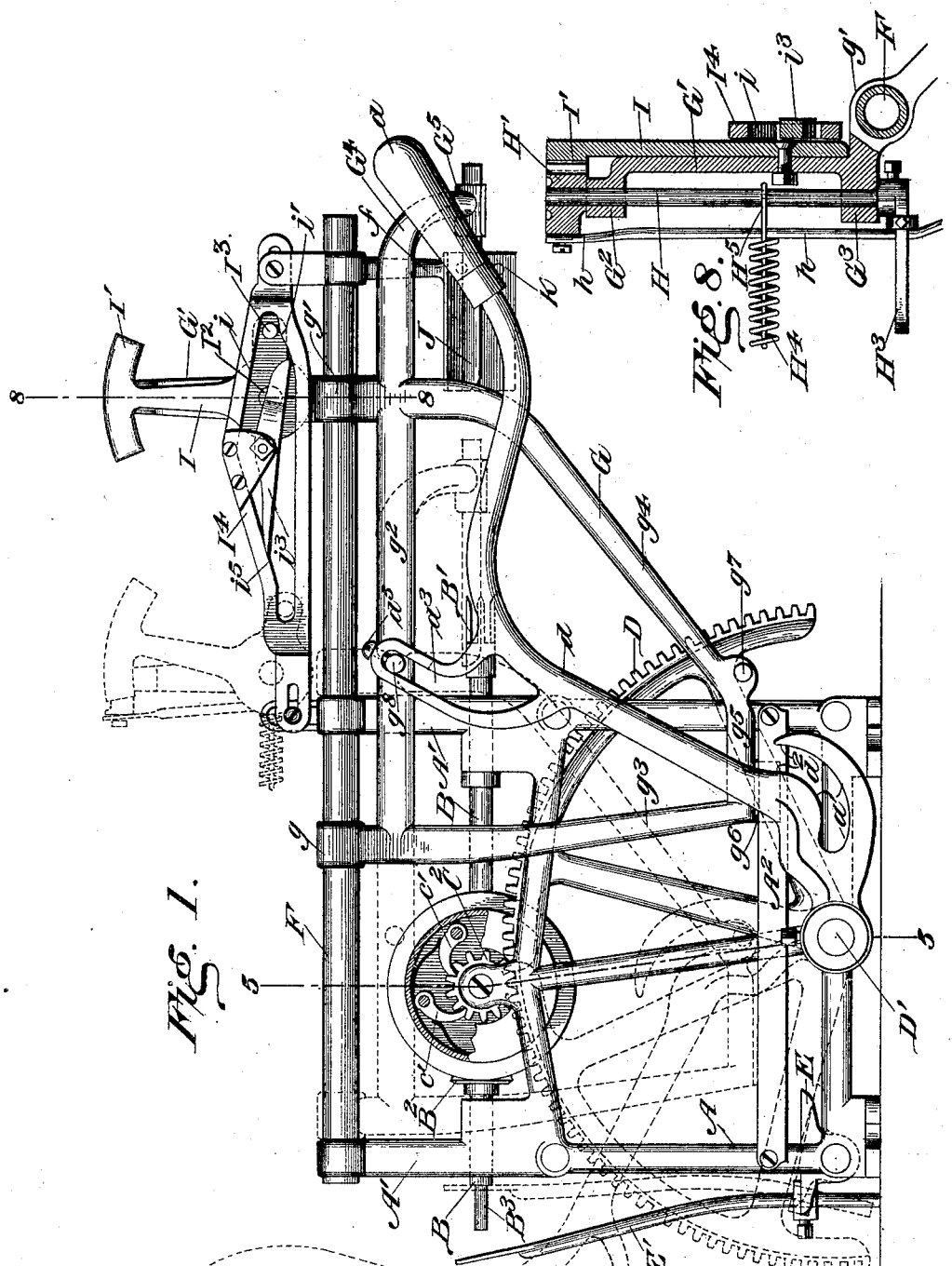

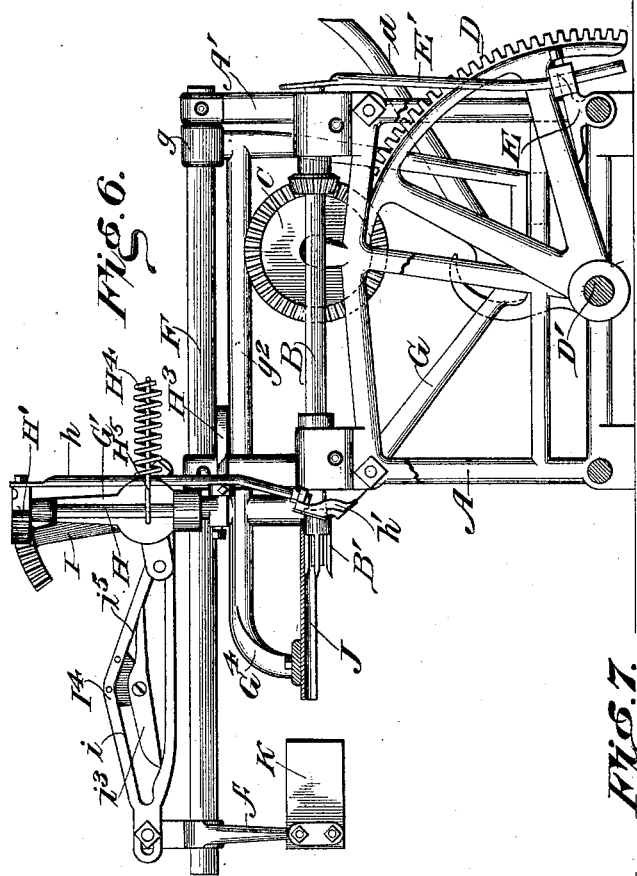
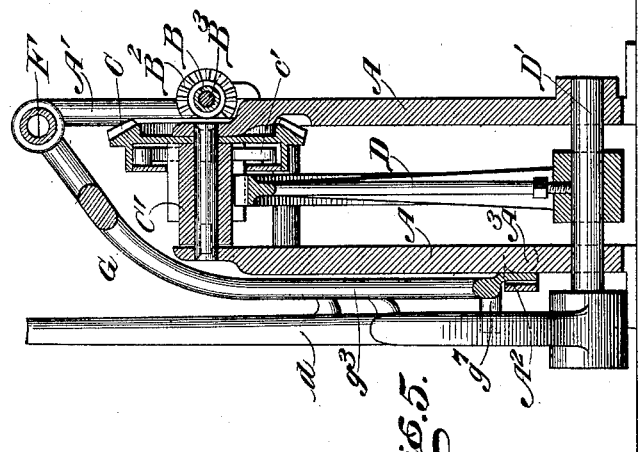
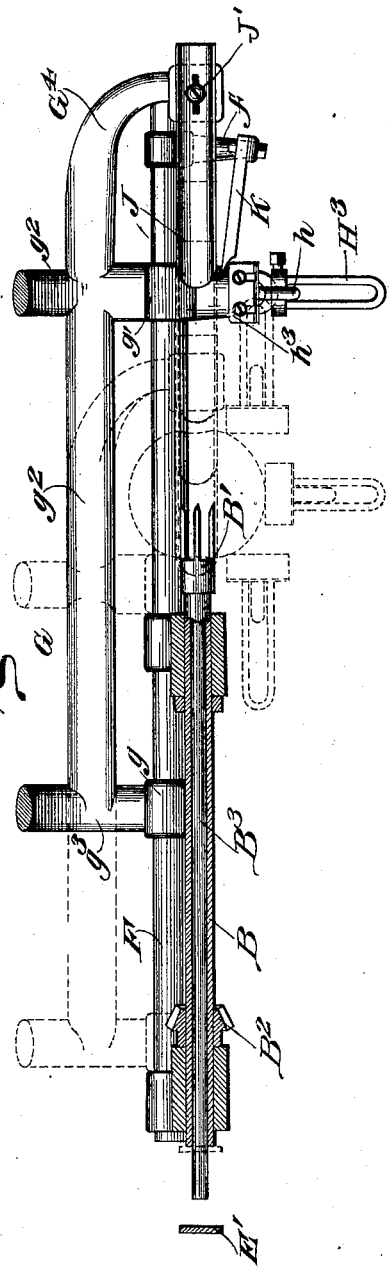

UNITED STATES PATENT OFFICE.

JOSEPH P. MAGNEY, OF ALLEGAN, MICHIGAN, ASSIGNOR OF ONE-HALF TO THEODORE S. UPDYKE, OF ALLEGAN, MICHIGAN.

APPLE CORER AND PARER.

SPECIFICATION forming part of Letters Patent No. 706,428, dated August 5, 1902.

Application filed December 21, 1901. Serial No. 86,815. (No model.)

*To all whom it may concern:*

Be it known that I, JOSEPH P. MAGNEY, of Allegan, in the county of Allegan and State of Michigan, have invented certain new and useful Improvements in Apple Corers and Parers; and I hereby declare that the following is a full, clear, and exact description thereof, reference being had to the accompanying drawings, which form part of this specification.

This invention is an improvement in machines for paring and coring apples and other fruits and vegetables; and its object is to produce a very rapid working machine which will thoroughly do the work, the attendant simply having to impale the apples on the fork and then give one reciprocating movement to a lever, during which movement the apple will be pared and cored, the cored apple removed from the fork and dropped into a receiving vessel, if desired, and the core ejected from the fork.

The machine embodies various novel features of construction and novel combinations of coöperative parts, as will be hereinafter set forth in the claims, and the accompanying drawings illustrate an efficient form of the machine, which I will describe in detail, with reference to the drawings, in which—

Figure 1 is a front elevation of the machine, viewed from the opposite side on which the operator stands, showing the parts in two extreme positions by aid of dotted lines. Fig. 2 is a rear elevation of the machine, showing the parts in position before paring. Fig. 3 is an end elevation. Fig. 4 is a plan view. Fig. 5 is a vertical transverse section on line 5 5, Fig. 1. Fig. 6 is a side elevation showing parts in position after paring and partly in longitudinal section. Fig. 7 is a broken view looking upward from beneath, showing the positions assumed by the knife in the paring operations. Fig. 8 is a detail section on line 8 8, Fig. 1. Fig. 9 is a detail end view, partly in section, showing position of knife after paring.

The framing A of the machine may be of any suitable construction. As shown, it is substantially rectangular, and in the upper part of the frame is journaled a horizontal longitudinally-disposed tubular shaft B, on one end of which is the apple-fork B'. This shaft is rotated by means of a bevel-pinion $B^2$, meshing with a bevel-gear C, mounted on a transverse shaft C', suitably journaled in the upper part of frame A at right angles to shaft B, and on shaft C' is loosely mounted a long pinion $C^2$, one end of which is adapted to be engaged by a series of pawls $c'$, attached to the back of gear C, so that when pinion $C^2$ is turned to the right the pawls $c'$ will cause gear C to rotate with pinion $C^2$, but will let gear C remain idle when pinion $C^2$ revolves in the opposite direction. Pinion $C^2$ is alternately rotated in opposite directions by means of a large segment D, which is fixed to a transverse shaft D', journaled in the lower part of the frame parallel with shaft C', which shaft D' is rocked at the will of the operator by means of a hand-lever $d$, rigidly fastened to one end of shaft D' and projecting upwardly, having a handle on its free end in convenient position to be grasped by the hand of the operator and vibrated manually. When the lever and segment have almost completed their movement to the left, (during which movement the paring and coring operations are performed,) the segment D strikes a pivoted stop-block E, journaled on a transverse pin connecting the sides of frame A, and rocks said block, causing a lever E', fast to the block, to move quickly forward and strike a core-ejecting rod $B^3$, lying loosely in shaft B and normally projecting slightly from the rear end thereof; but when lever E' strikes this rod $B^3$ and moves it the rod forces the core off the fork B', as will be obvious from Fig. 3 of the drawings.

Above and parallel with shaft B is a guide-bar F, which projects considerably beyond the end of the frame next fork B', said bar being supported upon vertical extensions A' of the main frame, as shown. Supported upon and guided by bar F is a movable frame G, having front and rear eyes $g$ $g'$ embracing the bar F and connected by a horizontal member $g^2$, from which depend two members $g^3$ $g^4$, which are connected at their lower ends by a short bar $g^5$, having a lug $g^6$, which is guided between two parallel bars $A^2$ $A^3$ on the main frame, as shown, so that the frame G is properly guided in its reciprocating movements.

The frame G is horizontally reciprocated by means of the lever $d$, which is provided with a cam-slot $d'$ near its pivoted end, adapted to engage with a stud $g^7$ on the lower end of bar $g^4$ after the frame G has commenced its rearward movement, said slot being open at its upper end, as at $d^2$, so that said lug can pass into and out of the slot, this slot and lug controlling the movement of the frame during the actual paring and coring operations, the initial movement and the termination of return movement of frame G being imparted by means of a second laterally-displaced cam-slot $d^3$ on the lever $d$, which is adapted to engage with a stud $g^8$ on bar $g^2$ of the frame, slot $d^3$ being open at bottom, as at $d^4$, so that stud $g^8$ can pass into and out of the slot. The two slots $d'$ and $d^3$ and the coacting studs $g^7$ $g^8$ are so relatively arranged that stud $g^7$ enters slot $d'$ just as stud $g^8$ leaves slot $d^3$, and vice versa, so that the frame G is always under the control of lever $d$; but these slots and studs are so formed that frame G is moved more rapidly by slots $d^3$ and stud $g^8$ than by slot $d'$ and stud $g^7$. A stop-bolt $d^5$ is tapped through the upper end of slot $d^3$ and is adapted to engage stud $g^8$ and arrest the return movement of the frame G at the proper point. To the eye $g'$ is attached a vertically-disposed standard G', having horizontally-projecting lugs $G^2$ $G^3$ at its upper and lower ends, provided with vertical apertures in which are journaled the knife-carrying shaft H, having a segment H' on its upper end, to which is pivotally connected the upper end of the knife-rod $h$, on the lower end of which is the knife-head $h'$, provided with a guard $h^2$ and knife edge $h^3$, similar to those used in ordinary apple-paring machines. This knife-head can move radially relatively to shaft H, but is guided in such movement by a slotted arm $H^3$, attached to the lower end of shaft H. A coiled spring $H^4$, attached to shaft H by a loop $H^5$ or other suitable means, presses the knife-rod $h$ inward toward shaft H at all times.

The segment H' meshes with a sector I' on the upper end of the longer arm of a bell-crank I, pivoted at its bend on a pin $I^2$, attached to standard G. The short arm of crank I has a pin or roller $I^3$, which engages a guideway $i$ in a plate $I^4$, supported above and on the projecting portion of bar F by suitable connections, as shown. The base of the guideway is traversed by the pin $I^3$ on the return stroke of the frame and is practically horizontal, so that the crank I is not oscillated until just before the frame reaches the end of its outward return stroke, when pin $I^3$ runs up a slight incline $i'$ at the rear or outer end of the slot and causes sector I' to rotate shaft H slightly, so as to throw the knife-head $h'$ into a position almost parallel with the frame. Within the guide-slot $i$, however, is pivoted a switch-cam $i^3$, which is weighted at its outer end, so as to drop down behind pin $I^3$ when the latter reaches the outer end of slot $i$, and on the inward movement of the frame pin $I^3$ has to ride up and over this cam $i^3$, which causes crank I to rock, so as to turn the shaft H and present the knife-head properly to the apple, and when the pin $I^3$ passes over the apex of the cam $i^3$ the knife has been turned to a position at right angles to the frame G and presses fully and properly against the butt or nose of the apple. During the further inward movement of the frame G pin $I^3$ is caused to pass under the downwardly-inclined upper edge $i^5$ of the cam-slot, over the tail of the cam-piece, moving the sector I' so as to present the knife-head properly to all portions of the apple, and when the frame reaches the end of its inward movement the knife-head has been turned a half-revolution on its axis. During the return outward stroke of the frame the knife-head remains in this position until just before the frame stops, when it is partly rotated to a position almost parallel with the frame by pin $I^3$ riding upon part $i'$ of the slot, as above stated. During the return stroke the pin $I^3$ passes under the cam $i^3$ and lifts the head of the latter, which, however, drops down behind the pin as soon as the latter has passed.

The coring-blade J is attached to a curved arm $G^4$, springing from the outer side of frame G. This coring-blade is preferably a semitubular knife, having a slotted end adjustably attached by a bolt J' to the suitably-shaped end $G^5$ of arm $G^4$. The coring-blade is supported in proper relation to the knife, so as not to interfere with the latter, and begins to core the apple as soon as the knife has pared the end thereof and moved sufficiently out of the way to allow the corer to enter the apple. The corer works close to and over the fork B' and assists in supporting the apple during the paring operation, and when such operation is complete the pared and cored apple remains practically suspended on blade J, and on the return stroke of frame G the cored apple is removed from the fork B' by the blade J, assisted by the knife-head, which then acts as a pusher to force the apple off the fork and along with the blade; but before the frame G reaches the end of its return stroke the cored apple is knocked off the blade J by means of the stripping-plate K, which is attached to an arm or bracket $f$, depending from the outer end of bar F, and lies in position to knock the apple off the blade J, as shown.

The operation is explained in the foregoing description of the several parts; but I will briefly recapitulate it for sake of brevity and clearness.

The frame G having been moved to the right, the operator impales an apple on fork B' in the ordinary manner and then forces the lever $d$ to the left, thereby moving frame G inward and carrying the knife and corer-blade along with the frame, and as the fork is rapidly rotated by the segment D and gearing actuated from the lever $d$ the apple is pared and cored during the backward stroke of the lever or inward movement of the frame G. Upon the completion of the paring and coring operations lever E' is thrown forward and strikes the ejector-rod, knocking the core from the fork, and on the return stroke of the lever the frame G moves outward, the pared and cored apple being taken from the fork on the corer-blade J and being subsequently forced off the blade by the stripping-plate K, and if a pan or vessel be placed beneath the stripper-blade the pared and cored fruit can be collected without handling. Thus the only manual operations necessary are the impaling of the apples on the fork and the reciprocation of lever $d$.

It will be observed that the paring-knife travels backward in a different position from that traversed in its operating movement and assists the corer-knife in removing the apple from the fork; also, that the corer-knife is rigidly attached to the movable frame and when once adjusted is not affected by wear and runs as close as possible to the fork. The feature of imparting a variable speed to the carriage, so that the knife is brought up quickly to the apple and then slowed down during the paring operation, is also one of the important practical advantages of the machine, and the novel manner of mounting the paring-knife upon the frame and devices for imparting the desired orbital movement thereto in the paring operation is another valuable feature of the invention.

Having thus described my invention, what I therefore claim as new, and desire to secure by Letters Patent thereon, is—

1. In an apple-parer, the combination of the fork and means for rotating it, a reciprocating frame, a vertical shaft carried by said frame, a knife-head-supporting rod suspended from said shaft, a spring for holding and drawing said rod toward the shaft, and a guide for the rod; with a crank pivoted beside the shaft, a gear on the upper end of the shaft, a sector on the upper arm of the crank meshing therewith, a pin on the short arm of the crank, and a stationary plate having a guide-slot traversed by said pin, substantially as and for the purpose described.

2. The combination of the fork and means for rotating it; with a reciprocating frame, the knife-supporting shaft carried thereby, a segment on the end of said shaft, a sector meshing with said segment, a bell-crank carrying said sector, on one arm and having a pin on its other arm, a stationary plate having a guide-slot traversed by said pin, and a cam pivoted in said guide-slot adapted to cause the proper oscillation of the crank when the frame moves toward the fork, substantially as described.

3. The combination of the rotatable tubular shaft, the core-ejector therein, the bevel-gears for rotating the tubular shaft, the sector, pinion and clutch for operating the gears, the pivoted stop for the sector, the lever attached to the stop adapted to actuate the core-ejector when the stop is struck by the sector; with a reciprocating frame, the coring-blade thereon, the knife-supporting shaft carried by said frame, a gear on the end of said shaft, a segment meshing with said gear, a bell-crank carrying said segment on one arm and having a pin on its other arm, a stationary plate having a guide-slot traversed by said pin, and a cam pivoted in said guide-slot and an oscillating lever and connections for operating the sector and said frame, all substantially as and for the purpose set forth.

4. The combination of a rotatable fork, a reciprocating frame, a cutter-head carried by said frame, means for partially turning said cutter-head during the paring operation, and for stopping its rotation on its return stroke, and a reciprocating lever and connections for operating said carriage and rotating said fork from such lever, substantially as described.

5. The combination of a rotatable fork, a reciprocating frame, a cutter-head carried by said frame, means for partially turning said cutter-head during the paring operation, and for stopping its rotation on its return stroke, and a reciprocating lever and connections for operating said carriage and rotating said fork from such lever; with a coring-knife rigidly attached to said frame in rear of the cutter-head, and adapted to core the fruit simultaneously with the paring operation, substantially as described.

6. In an apple-paring machine, the combination of the movable frame, a rotatable shaft mounted thereon, the knife-head suspended from and rotatable with the shaft, a segment on the shaft, a sector meshing with the segment, and a vibrating arm carrying the sector having a pin; with a slotted plate beside the path of the sector having a slot adapted to be traversed by said pin to rock the arm, and a cam adapted to engage the pin and rock the sector during the paring operation, substantially as described.

7. In an apple-paring machine, the combination of the rotatable shaft, the fork on one end thereof, the bevel-gear and pinion for actuating said shaft, a vibrating segment, a pinion meshing with said segment, and clutch devices between said pinion and gear; with a reciprocating frame, the paring devices thereon and a rocking lever connected to the segment having open-ended cam-slots adapted to alternately engage pins on the frame and reciprocate the latter, said slots and pins imparting different speed to the frame in its strokes, substantially as described.

8. In an apple-paring machine, the combination of the rotatable fork, a reciprocating frame, the coring and paring devices mounted thereon; a rocking lever provided with open-ended cam-slots at different distances from its pivot, and studs on the frame adapted to be respectively engaged and disengaged by the cam-slots of the lever on each stroke of the frame, for the purpose and substantially as described.

9. In an apple-parer, the combination of the sliding frame, a rotatable shaft mounted thereon, the knife-head suspended from said shaft, a segment on the shaft, a sector meshing with the segment, and a rocking arm carrying the sector on one end and having a pin on the other end; with a slotted guide-plate beside the path of the sector having a slot adapted to be traversed by said pin, and a cam-plate pivoted in the slot and adapted to engage the pin and rock the sector during the paring operation, substantially as described.

10. The combination of the rotary shaft carrying a fork, the oscillating segment and gearing for rotating said shaft, and a rocking lever for oscillating said segment provided with open-ended cam-slots at different distances from its pivot; with a reciprocating frame movable to and from the fork, provided with studs respectively adapted to be successively engaged and disengaged by the corresponding cam-slots of the lever on each stroke of the frame to impart different speeds to the latter, substantially as described.

11. The combination of the rotary shaft carrying a fork, the oscillating segment and clutch-gearing for rotating said shaft, and a rocking lever for oscillating said segment provided with upper and lower open-ended cam-slots; with a reciprocating frame movable to and from the fork, provided with upper and lower studs adapted to alternately and respectively engage and disengage the cam-slots of the lever on each stroke of the frame to impart different speeds thereto, and the paring and coring devices mounted on and movable with said frame, substantially as described.

12. The combination of the rotary shaft carrying a fork, an oscillating lever having two open cam-slots at different distances from its pivot, clutch-gearing actuated by said lever for rotating said shaft, and means for ejecting the core upon the completion of the paring and coring operations; with a reciprocating frame movable to and from the fork, upper and lower studs on said frame adapted to alternately engage the slots on the lever on each stroke of the frame to impart different speeds thereto, and the paring and coring devices mounted on and movable with said frame, all substantially as and for the purpose described.

13. In an apple-parer, the combination of the fork and means for rotating it, a reciprocating frame, a vertical shaft carried by said frame, a knife-head suspended from said shaft, a controlling-spring for the knife-head, and a guide therefor, a crank pivoted beside the shaft, a sector on one end of the crank meshing a gear on the shaft, and a pin on the other arm of the crank; with a stationary plate having a guide-slot traversed by said pin and a cam pivoted in said slot, substantially as and for the purpose described.

In testimony that I claim the foregoing as my own I affix my signature in presence of two witnesses.

JOSEPH P. MAGNEY.

In presence of—
T. S. UPDYKE,
GEO. W. WISE.